Patented Nov. 12, 1929

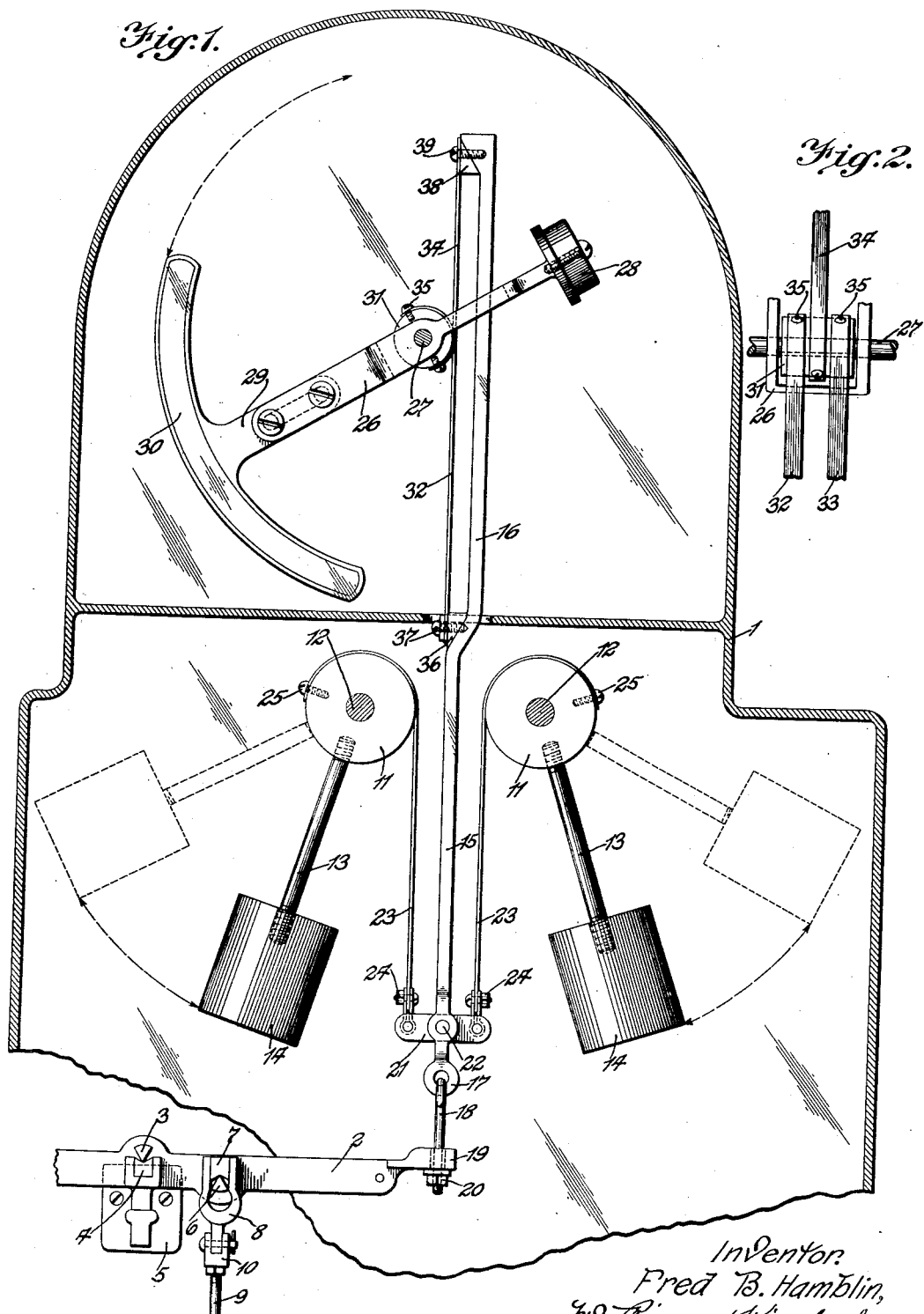

1,735,571

UNITED STATES PATENT OFFICE

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI

SCALE

Application filed June 4, 1926. Serial No. 113,648.

This invention relates to improvements in scales and consists in the novel construction hereinafter disclosed.

An object of the invention is to provide, in a scale, an improved counterweight mechanism so arranged that it will correct out-of-level condition in the scale, said weighing mechanism being associated with weight-indicating mechanism, whereby the arc of travel of the pendulums of the weighing mechanism are translated into an increased arc of movement in the weight-indicating mechanism.

Additional advantages of the structure will be apparent from the following detailed description thereof, taken in connection with the accompanying drawing, in which, Fig. 1 is a vertical section illustrating the association of the parts.

Fig. 2 is a detail view of the connection with the chart drum of the indicating mechanism.

In the embodiment of the invention illustrated in the drawing, the construction is shown as including the novel parts of the weighing mechanism associated with and connected to weight-indicating mechanism. The mechanism of the scale is included in a housing 1, a portion of which is shown in the drawing. The main scale beam 2, a portion of which is shown, is supported in the housing intermediate of its ends on a knife-edge bearing 3 which operates in a bearing block 4 carried by a bracket 5 supported by one wall of the housing.

An upwardly presented knife-edge member 6 is fixed transversely of the beam 2 on opposite sides of the beam and a pair of inverted blocks 7 having inverted V-shaped grooves therein mounted over the member 6. These blocks are supported in the slotted end of a yoke 8, the lower end of said yoke being connected with a steelyard 9 by a pivot connection 10. It will be understood that the opposite end of the steelyard 9 is associated with the weight-receiving platform of the scale.

The structure just described will be recognized as standard mechanism for transferring the load to the main beam of the scale.

The weighing mechanism of the present improvement includes a pair of pendulums comprising drums 11 mounted for rocking movements on shafts 12, said shafts being supported by bearings carried by some stationary part of the housing, and the shafts being arranged on parallel axes spaced from each other. To each of the drums 11 is connected a pendulum rod 13 to the outer end of each of which is attached a pendulum weight 14.

A bar 15 having an offset upper portion 16 is connected with the free end of the scale beam by an adjustable universal connection comprising, in the illustrated form, an eye 17 on the end of the rod 15 into which is connected a hook 18, the lower end of said hook extending through an eye 19 formed at the end of the main beam 2, the lower end of said hook being threaded to receive a nut and washer 20 so that the length of the connection between the beam and the end of the rod 15 may be varied.

Arranged transversely of the lower end of the rod 15 is a lever 21 pivoted to the rod 15 by a pivot pin 22, said lever constituting an equalizing tree for the ends of the pendulum tapes. Pendulum tapes 23 are connected with the respective extremities of the lever 21 by any suitable form of adjustable connections 24, and the upper ends of said tapes seating over an arc on the upper face of the periphery of each of the drums 11 and being connected to the drums in any suitable manner, such, for instance, as by screws 25.

The drums 11 are equally weighted so that, if the support for the scale is out of level, the lever 21 will equalize the weight resistance of the load transferred to the beam through the steelyard 9 and the leverage of the weighing mechanism will remain uniform regardless of whether or not the axis of the rod 15 remains normal to the support for the scale.

The weight of the pendulums is adjusted for predetermined increments of load, the pendulums being so weighted that the capacity of the scale swings the pendulums in a predetermined arc, such, for instance, as indicated in the dotted lines in the drawing, over an arc angle of forty-five degrees.

The weight-indicating mechanism is associated with the weighing mechanism through the medium of the bar 15 with its extension 16 and flexible connections with a chart arm. The particular type of weight-indicating mechanism disclosed in the drawing includes a bifurcated chart arm 26 mounted on a shaft 27, said shaft 27 being supported in suitable bearings carried by a stationary part of the scale housing. The upper end of the chart arm carries a balancing weight 28 and the other end of the arm carries a chart holder 29 having a chart segment 30 in which is supported a scale preferably in the form of a film carrying the weight indicia for projection upon a reading screen.

The chart segment 30 is arranged with the weight indicia coordinated with the arcuate movement of the pendulums of the weighing mechanism so that predetermined incruments of load will be translated into chart units which are, in turn, projected on the reading screen for indicating the weight to which the movement of the pendulums respond.

The shaft 27 carries a drum 31, the peripheral length of which is arranged in a decreased ratio in respect of the peripheral length of the drums 11 so that there will be a differential peripheral movement permitting a longer arc of swing of the chart arm in respect of the arcuate movement of the pendulums of the weighing mechanism.

The drum 31 is connected with the upper extension 16 of the rod 15 by means of tapes 32, 33 and 34, the said tapes being arranged preferably as shown in Fig. 2 of the drawing, so as to equalize and balance the pull exerted by the longitudinal movement of the rod 15. The tapes 32 and 33 are arranged in parallel spaced relationship and have their upper ends attached to the periphery of the drum 31 by screws 35 and their lower ends attached to a block 36 carried transversely of the rod 15, said tapes being connected with the block 36 by screws 37. The tape 34 connects with the upper end of the extension 16 of the rod 15, said tape being connected with a block 38 extending transversely of the extension 16 of the rod 15, said tape being balanced by a screw 39.

From the foregoing description, the construction and operation of the device will be readily understood. It will also be understood that the structure thereof may be modified within equivalent limits without departing from the spirit and scope thereof. I do not limit myself to unessential details thereof, but what I claim and desire to secure by Letters Patent is:

1. In a scale, the combination with a pivoted scale beam, a steelyard connected with the scale beam for transferring the load thereto, of a rod connected with one end of said scale beam, weighted pendulums supported on opposite sides of said rod, flexible connections attached to each of said pendulums, an equalizing connection between said flexible connections and said rod, and a weight indicating segment flexibly connected to said rod.

2. In a scale, the combination with a pivoted scale beam, a steelyard connected with the scale beam for transferring the load thereto, of a rod connected with one end of said scale beam, weighted pendulums supported on opposite sides of said rod, flexible connections attached to each of said pendulums, an equalizing connection between said flexible connections and said rod, weight-indicating mechanism and flexible tape connections between said weight indicating mechanism and said rod.

3. In a scale, the combination with a pivoted scale beam, a steelyard connected with the scale beam for transferring the load thereto, of a rod connected with one end of said scale beam, weighted pendulums supported on opposite sides of said rod, flexible connections attached to each of said pendulums, an equalizing connection between said flexible connections and said rod, and weight-indicating mechanism connected to said rod by flexible connections.

4. In a scale, the combination with a pivoted scale beam, of a longitudinally movable member connected to one end thereof, drums disposed on opposite sides of said member, pendulum weights attached to said drums, flexible tapes extending from said drums, an equalizing lever connected to said tapes and pivoted to said longitudinally movable member, and weight indicating mechanism flexibly connected with said member.

5. In a scale, the combination with a pivoted scale beam, of a longitudinally movable member connected to one end thereof, drums disposed on opposite sides of said member, pendulum weights attached to said drums, flexible tapes extending from said drums, an equalizing lever connected to said tapes and pivoted to said longitudinally movable member, weight-indicating mechanism including a drum having less diameter than said first named drums, an arm carried by said drum, a scale segment carried by said arm, and flexible connections between said drum and said longitudinally movable member, said flexible connections extending in opposite directions to impart arcuate motion to said drum in response to the longitudinal movement of said longitudinally movable member.

6. In a scale, the combination of a main scale beam, with two pendulum drums mounted for rocking movement in opposite directions, a pendulum weight carried by each of said drums, a tape extended from connection with each of said drums, an equalizing connection between said tapes and said main scale beam, a rod extending upwardly from said connection, a drum, a weight indicating device in connection with said last named drum, a pair of tapes each having one end connected to said last-named drum and the opposite end connected with said rod in spaced relationship, and an additional tape having one end connected with said last named drum and extending oppositely from and between said pair of tapes to connection with said rod.

FRED B. HAMBLIN.